United States Patent [19]
Rinne

[11] Patent Number: 5,251,912
[45] Date of Patent: Oct. 12, 1993

[54] RADIALLY ENERGIZED SEAL

[75] Inventor: Erkki Rinne, Espoo, Finland

[73] Assignee: Unicraft Oy, Helsinki, Finland

[21] Appl. No.: 665,645

[22] Filed: Mar. 21, 1991

[30] Foreign Application Priority Data

Oct. 3, 1989 [FI] Finland .................................. 894671
Jan. 18, 1991 [FI] Finland .................................. 910261

[51] Int. Cl.$^5$ .......................... F16J 15/20; F16J 15/46
[52] U.S. Cl. ........................................... 277/3; 277/22;
277/27; 277/34; 277/102; 277/228; 277/DIG. 6
[58] Field of Search ...................... 277/3, 22, 102, 105,
277/106, 116.6, 119, 120, 121, 228, 27, 34, 34.3,
34.6, DIG. 6; 285/95, 96, 97, 100, 346

[56] References Cited

U.S. PATENT DOCUMENTS

| | | | |
|---|---|---|---|
| 967,392 | 8/1910 | Kingsbury | 277/105 |
| 1,590,580 | 6/1926 | Hume | 285/96 X |
| 1,914,741 | 6/1933 | Gysling | 277/34 |
| 2,246,600 | 6/1941 | Putnam et al. | 285/96 X |
| 2,306,160 | 12/1942 | Freyssinet | 277/34 |
| 2,485,497 | 10/1949 | Lemley et al. | 285/96 |
| 2,491,599 | 12/1949 | Allen | 277/2 |
| 2,504,470 | 4/1950 | Payne | 277/59 |
| 2,536,898 | 1/1951 | Works | 285/96 |
| 2,731,282 | 1/1956 | McManus et al. | 277/2 |
| 2,794,661 | 7/1957 | Sears | 287/85 |
| 2,852,287 | 9/1958 | Baker | 287/85 |
| 2,992,028 | 7/1961 | Knox | 277/1 |
| 3,284,086 | 11/1966 | Primrose et al. | 277/102 |
| 3,360,273 | 12/1967 | Hundt et al. | 277/34 |
| 3,400,937 | 9/1968 | Crankshaw | 277/3 |
| 3,471,156 | 10/1969 | Burns et al. | 277/34 |
| 3,608,912 | 9/1971 | Templin | 277/102 X |
| 4,162,078 | 7/1979 | Cox | 277/102 |
| 4,216,981 | 8/1980 | Jensen | 285/97 |
| 4,430,017 | 2/1984 | Stefancich | 403/104 |
| 4,751,542 | 3/1988 | Kimerly | 277/34 |
| 4,790,544 | 12/1988 | Kemp | 277/34 |
| 4,993,722 | 2/1991 | Gundy | 277/34.3 |
| 5,174,585 | 12/1992 | Erkki | 403/269 X |

FOREIGN PATENT DOCUMENTS

| | | | |
|---|---|---|---|
| 1400226 | 11/1968 | Fed. Rep. of Germany . | |
| 2437138 | 2/1976 | Fed. Rep. of Germany | 277/34.3 |
| 2632526 | 1/1978 | Fed. Rep. of Germany . | |
| 3318288 | 11/1984 | Fed. Rep. of Germany . | |
| 3321505 | 12/1984 | Fed. Rep. of Germany . | |
| 3445805 | 5/1986 | Fed. Rep. of Germany | 277/DIG. 6 |
| 2485677 | 12/1981 | France | 277/DIG. 6 |
| 0124864 | 7/1983 | Japan | 277/DIG. 6 |
| 7211769-0 | 9/1971 | Sweden . | |
| 511104 | 9/1971 | Switzerland . | |
| 538057 | 7/1973 | Switzerland . | |
| 0649140 | 4/1985 | Switzerland | 277/34.3 |
| 0694710 | 10/1979 | U.S.S.R. | 277/3 |
| 0877192 | 11/1981 | U.S.S.R. | 277/34 |

Primary Examiner—William A. Cuchlinski, Jr.
Assistant Examiner—James K. Folker
Attorney, Agent, or Firm—Christie, Parker & Hale

[57] ABSTRACT

This invention relates to an adjustable packing for sealing a gap between two surfaces. The packing includes a packing member for sealing the gap, the sealing pressure thereof being adjusted by means of the elastomer, preferably two-component silicone, serving as a pressure medium. The elastomer is at least partially in the form of particles in an elastomer chamber. Between the elastomer and the walls of the elastomer chamber is preferably applied a suitable grease layer or a release agent layer which assists the function of the elastomer as a pressure medium.

17 Claims, 7 Drawing Sheets

RADIALLY ENERGIZED SEAL

CROSS REFERENCE TO RELATED APPLICATIONS

Priority of U.S. patent application Ser. No. 07/592,270, filed Oct. 3, 1990, now U.S. Pat. No. 5,174,585, issued Dec. 29, 1992, Finnish application Ser. No. 894671, filed Oct. 3, 1989 and Finnish application Ser. No. 910261, filed Jan. 18, 1991 are hereby claimed, and the subject thereof is incorporated herein by reference.

FIELD OF THE INVENTION

The present invention relates to an adjustable packing for packing or sealing a gap between two surfaces.

The invention relates also to the application of such packing as a shaft packing, particularly for a valve rod, a pump shaft, a piston rod or the like.

BACKGROUND OF THE INVENTION

The prior art recognizes a variety of packings wherein the sealing effect is achieved by means of an elastomer material which is pressurized by means of a hydraulic fluid or compressed air. One embodiment of the present invention is an adjustable packing for packing a gap between two surfaces, the packing comprising a packing member for sealing said gap, elastomer for adjusting the sealing pressure of said packing member, said elastomer comprising either partially the form of particles or preshaped pieces. The use of elastomer, which is at least partially in particular form, provides for an intensified pressure transmission ability of elastomer if compared with the use of a substantially uniformly preset elastomeric compound and, in addition, the particulate form of elastomer provides for considerably more freedom in shaping regarding the elastomer spaces/passages.

The packing or sealing of shafts has been carried out earlier by using various cord packing arrangements, but one drawback with these is that they produce a relatively high initial resistance, i.e., the static friction of a shaft relative to such packing clearly exceeds the kinetic friction. The conducted preliminary tests have indicated that the kinetic friction is about 75% of the static friction reading.

SUMMARY OF THE INVENTION

One embodiment of the present invention provides a shaft packing structure wherein static and kinetic frictions are close to each other and, in addition, said frictions are at a substantially lower level than in a corresponding cord packing. A feature of one embodiment of the invention is an improved shaft packing which prevents leakage when subjected to radial forces produced by the tilting of a shaft. Another problem with cord packings is that, when subjected to the action of said radial forces, such packing collapses and, thus, when the action of force ceases, the packing is not always capable of resuming its original form and this results in a leakage.

An embodiment of the invention to solve this problem uses a spring as a pressure equalizer.

Elastomer is preferably compressed in position inside a packing sleeve and/or in a medium chamber defined by a packing sleeve and a packing box, the compression being effected by using preset elastomer in the form of preshaped pieces and in particulate form (particles/powder). Compression can be carried out either after the installation of a packing sleeve or, when using a sleeve provided with a medium chamber inside the sleeve, also prior to the installation of a sleeve. The walls of a medium chamber are treated with a suitable grease, or some other release agent, prior to the compression of elastomer in order to maintain the elastomer off the walls.

A packing sleeve can be preferably fitted in its packing box by compressing TEFLON (polytetrafluoroethylene) and/or a like material with a suitable tool into the packing box and by molding the material at the same time into a sleeve shape. The tool may comprise an axle, having a diameter slightly exceeding that of a shaft to be packed, and a bushing member spaced from the surface of said axle, the wall thickness of said bushing member matching the width of a desired medium chamber in radial direction, whereby a packing sleeve is formed between the axle and the bushing member.

In order to reduce a friction moment, the surface of a packing sleeve facing a shaft is preferably provided with grooves. This groove pattern assists in keeping the packing surface clean.

BRIEF DESCRIPTION OF THE DRAWINGS

The invention will now be described with reference made to the accompanying drawings, in which:

FIGS. 5, 7, and 8 are each cross-sectional diagrams of a pressurized elastomer compression implement.

In the figures, like components are designated by like reference numerals.

DETAILED DESCRIPTION OF THE FIGURES

Figure 1:
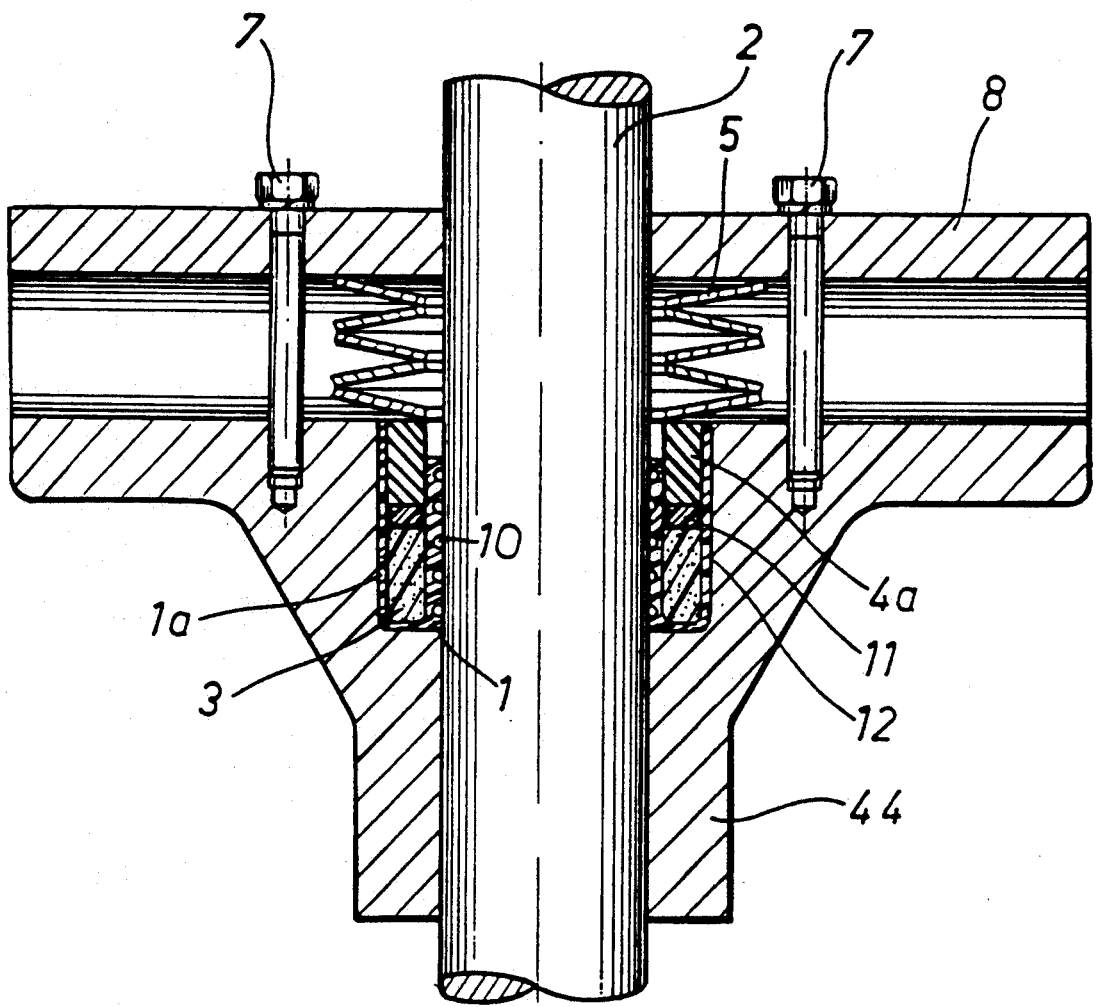
FIGS. 1–4 and 8 are each cross-sectional diagrams of a preferred embodiment of the invention.

FIG. 1 illustrates an embodiment of a shaft packing wherein the packing includes a packing sleeve 1 which has been molded into a U-shaped cross section for providing a space for elastomer 3 between the leg 1a of the U-shaped packing sleeve 1 with opening of the U facing a packing box 9 the other leg of which faces a shaft 2. Elastomer can be compressed in position in particulate form, either after the installation of a packing sleeve 1 or preferably prior to that, whereby elastomer supports the packing sleeve during the course of its installation. A suitable elastomer is silicone rubber, such as two-component, room temperature vulcanizing (RTV) silicone rubber which is made of a silicone rubber base and a catalyst or curing agent, e.g., RTV-2 manufactured by Wacker-Chemie GmbH, Federal Republic of Germany.

Elastomer 3 is maintained in position in a chamber and is compressed by means of a plunger 4a having its elastomer-facing surface preferably provided with a compaction member 11, which is fitted with molded lip portions 12 for preventing the penetration of elastomer in between plunger 4a and the walls of packing sleeve 1. Naturally, said lip portion can be formed integrally with plunger means 4a. Plunger means 4a is further provided with a spring member 5 serving as a pressure equalizer to compensate for the pressure fluctuations in elastomer 3 caused by temperature differences. The plunger means 4a, along with its spring 5, is maintained in position by means of a cover 8, which is secured to the body section by means of fastening bolts 7. The surface of packing sleeve 1 facing shaft 2 is provided with grooves 10. Naturally, said spring member 5 can also be fitted between bolts 7 and cover 8 whereby said cover 8 is acting directly on plunger means 4a.

Figure 2:
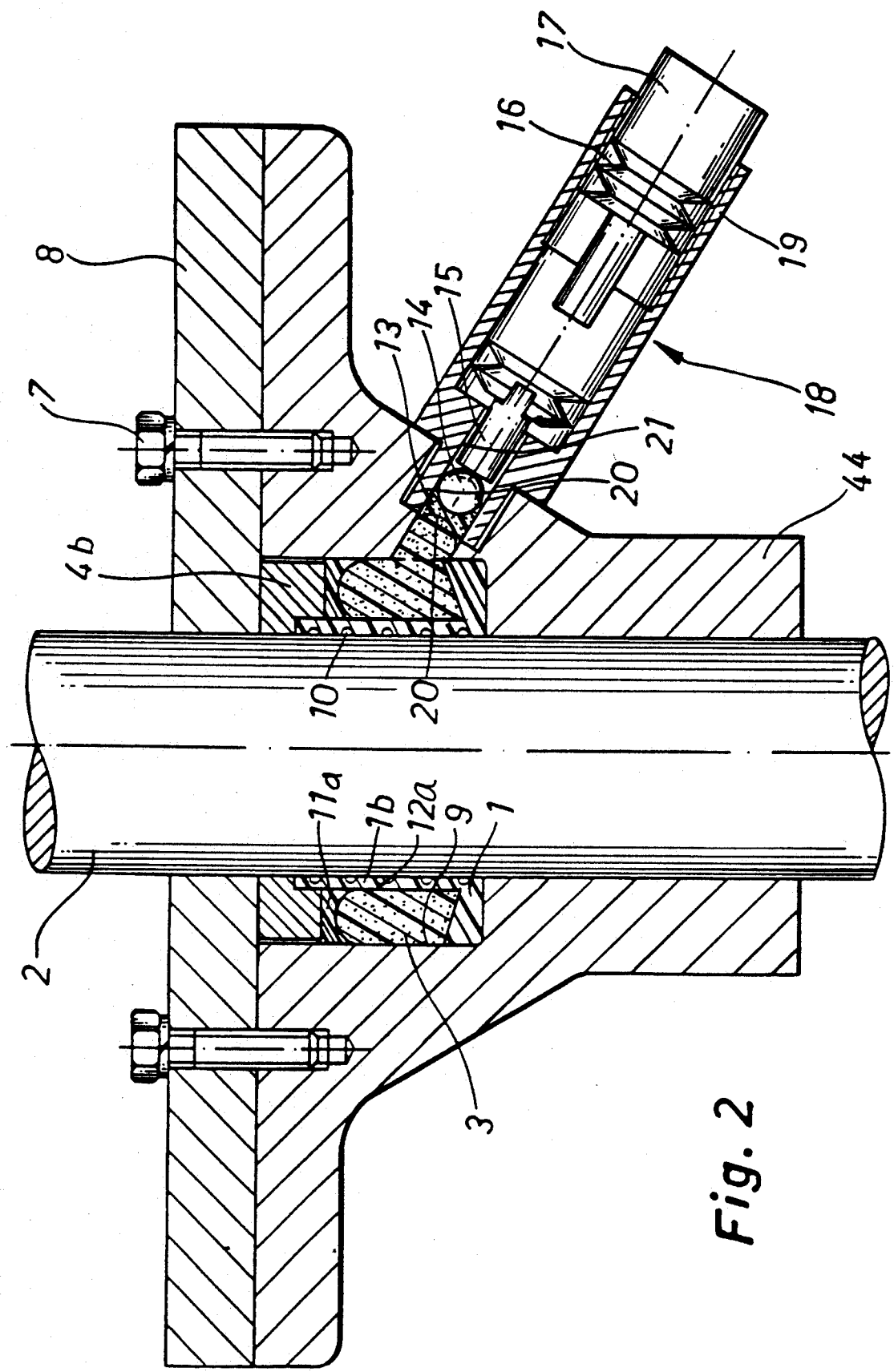

FIG. 2 differs from the embodiment of FIG. 1, primarily in that a plunger 4b (with no spring members 5) is tightened by means of a cover 8 and bolts 7 in a permanently fixed position, the compression and/or the equalization of pressure differences of elastomer being effected by using a separate compensator 18. In addition, the embodiment of FIG. 2 differs from that of FIG. 1 in the design of a packing sleeve 1, the packing sleeve in FIG. 2 being designed as a cylinder carrying at its bottom edge an integral flange member 1b whereby elastomer 3 is set in the space of packing sleeve 1b defined by a packing box 9. Thus, said plunger element 4b bears an effect on elastomer 3 through the intermediary of a sealing 11a, having a molded lip 12a, between packing sleeve 1b and the wall of packing box 9. Compensator 18 includes a body portion provided inside with spring members 16 fitted with a pin member 15 at its elastomer-facing end. The pin member 15 is accompanied by a ball 14 which, in turn, is associated with a TEFLON made sealing 13 with elastomer 3 on its other side. The TEFLON sealing is provided with lip portions 20 facing both the elastomer chamber and ball 14. These lip portions intensify the sealing effect of TEFLON sealing 13 and further assist in reducing wearing of the wall of a packing cylinder 21 by producing a protective layer between ball 14 and said wall. In addition, ball 14 continuously works over the surface of TEFLON sealing coming against it to prevent said lip portion from gradually wearing down. Furthermore, the end 17 of spring elements facing away from the elastomer layer is provided with elements (not shown) for creating an initial pressure for the spring elements and for restricting the axial movement thereof to a desired location relative to body portion 19.

Figure 3:
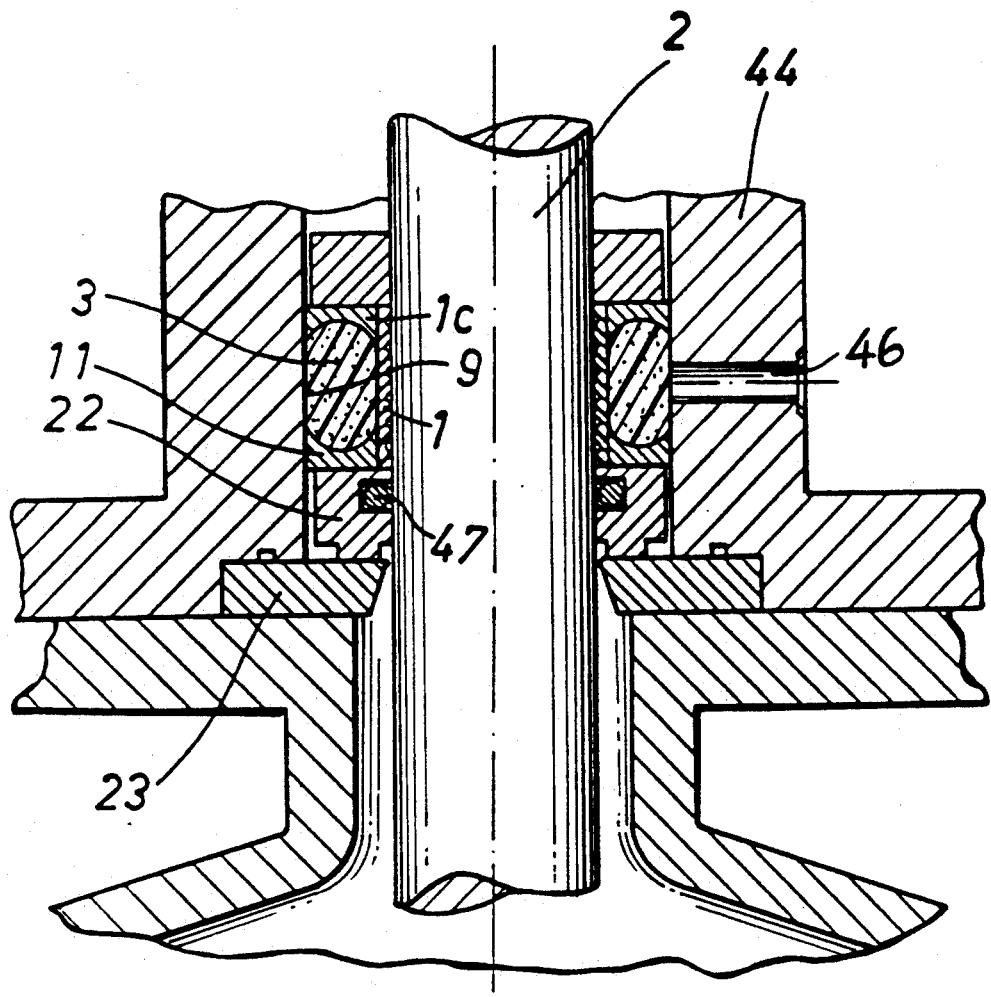

In FIG. 3, a packing sleeve 1 and a flange member 1c are designed as separate components. Another difference between the embodiment of FIG. 3 and that of FIGS. 1 and 2 is that, in addition to a radial force directed to packing sleeve 1, said elastomer 3 applies an axially-directed force through the intermediary of a sealing to a plunger element 22, which is preferably made of a ceramic material and which, in turn, presses against a flange member 23, which is preferably made of an appropriate metal and whose surface coming against plunger element 22 is ground to an appropriate surface roughness value. Thus, the surfaces of plunger element 22 and flange member 23 coming against each other provide an additional sealing. Plunger element 22 can yet be further fitted with a conventional sealing 47. In the embodiment of FIG. 3, the compression of elastomer is effected by means of a charging hole 46 made in a body portion 44 whereby an appropriate compression implement is placed in said hole.

Figure 4:
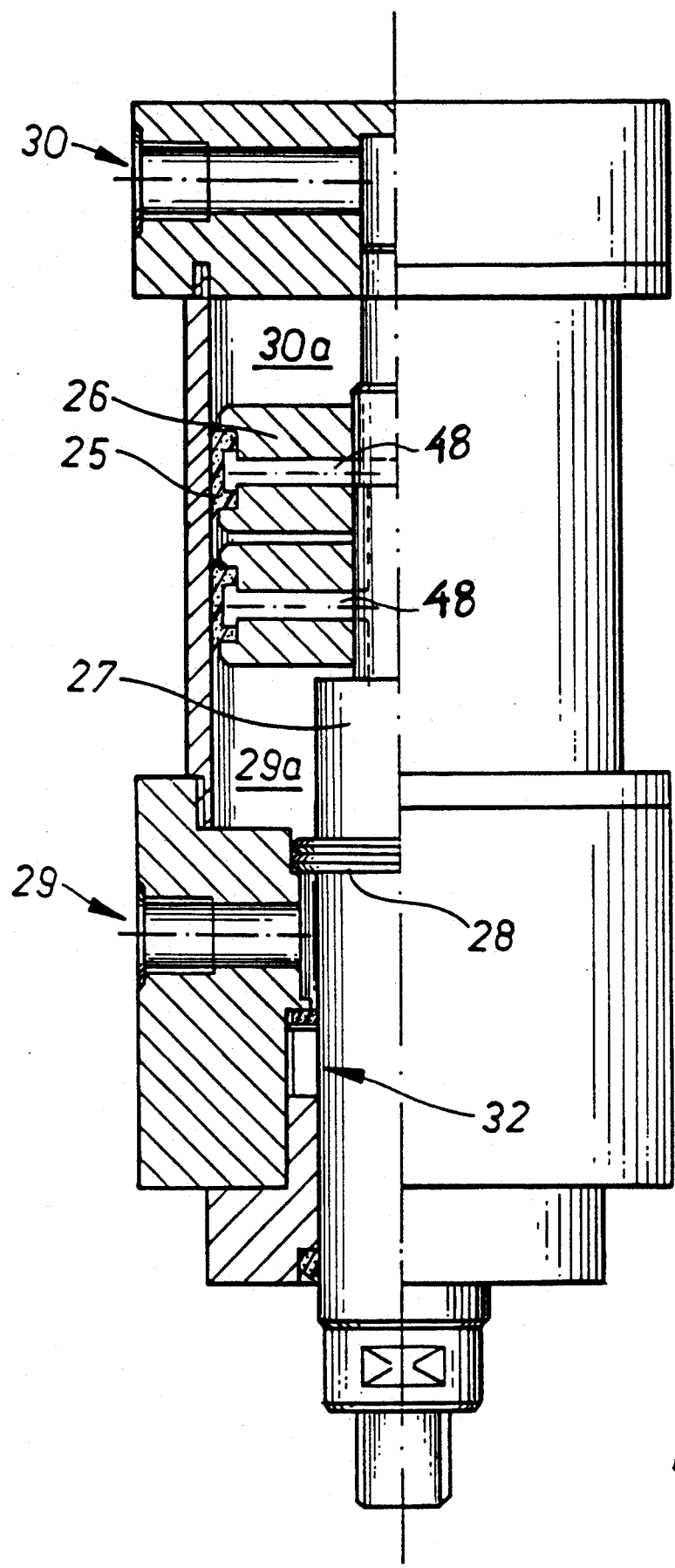

FIG. 4 illustrates a packing system for a double-action hydraulic cylinder wherein a packing 25 is formed on a hydraulic cylinder piston 26, the illustrated case including two such pistons. Pistons 26 are mounted on a shaft 27 and provided with passages 48 for delivering elastomeric medium to packings 25. The compression of elastomeric medium can be effected by means of a compression implement (not shown) fitted inside said shaft 27, which implement can be provided with appropriate spring elements for eliminating the pressure fluctuations caused by temperature differences. On either side of pistons 26, said hydraulic cylinder includes hydraulic fluid chambers 29a and 30a wherein the hydraulic fluid is supplied through openings 29 and 30, respectively. In addition, said shaft 27 is provided with a shock absorber 28. In order to prevent the outward leakage of the hydraulic fluid delivered through opening 29, a location 32, directed away from hydraulic fluid chamber 29a is fitted with a packing system, as shown in FIGS. 1-3 or 5.

Figure 5:
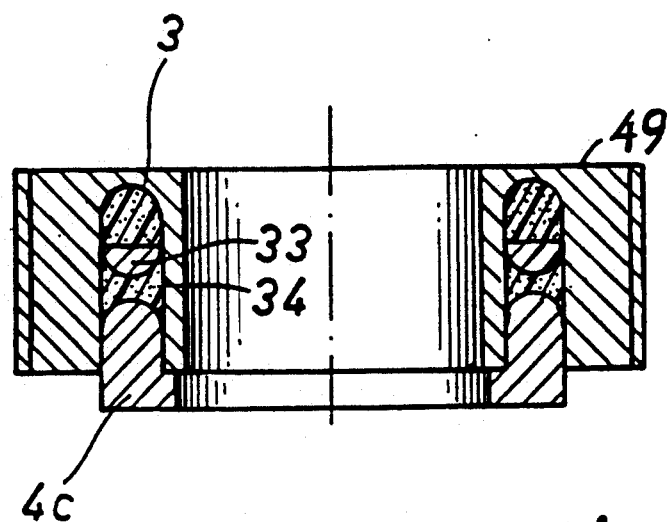
Figure 6:
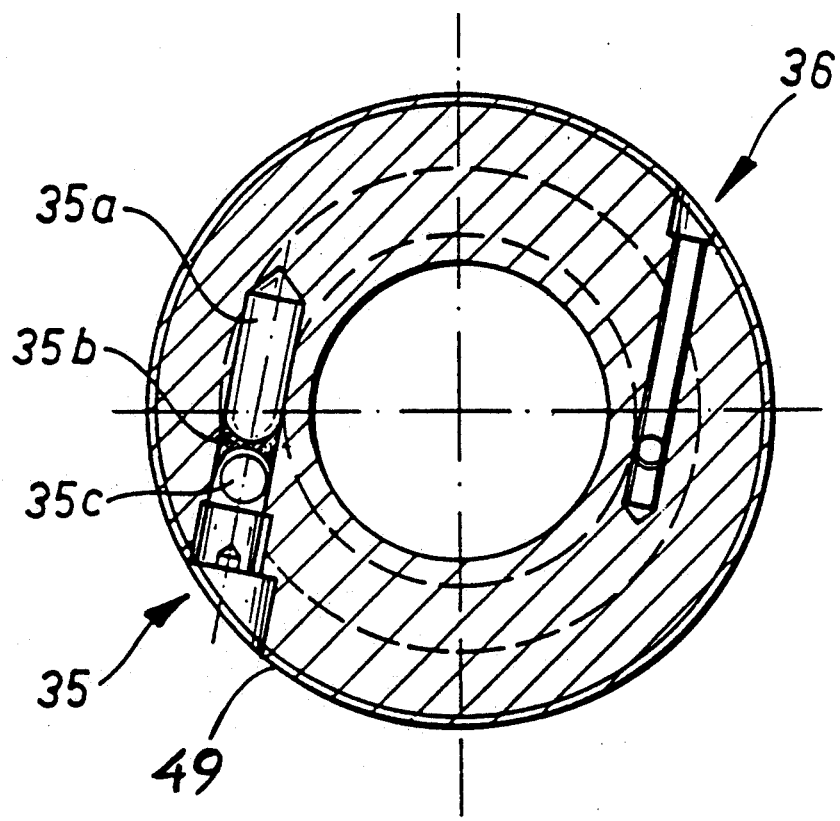
FIG. 6 is a lateral cross-sectional view of the pressurized elastomer compression implement of FIG. 5.

FIG. 5 is a laterally shown sectional view of one arrangement for pressurizing a plunger element 4c corresponding to plunger elements of FIGS. 1 and 2, and FIG. 6 shows the embodiment of FIG. 5 in a plan view. The pressurization of plunger element 4c is effected by means of elastomer 3 which, in turn, is compressed mechanically by means of a compression implement 35 comprising a ball 35c, a sealing 35b, and a piston pin 35a. The arrangement further includes a charging hole 36 for delivering elastomer 3 into its compression chamber During the course of compression of elastomer, the latter transmits a force through the intermediary of a member 33 and a sealing 34 to plunger element 4c which, in turn, transmits a force to the elastomer acting on the packing sleeve 1 so as to shift said packing sleeve 1 against the surface of shaft 2. In the embodiment of FIGS. 5 and 6, a body portion 49 is preferably provided with an external threading for readily connecting said body portion to a body portion 44, as shown in FIGS. 1 and 2, and including a packing sleeve 1.

Figure 7:
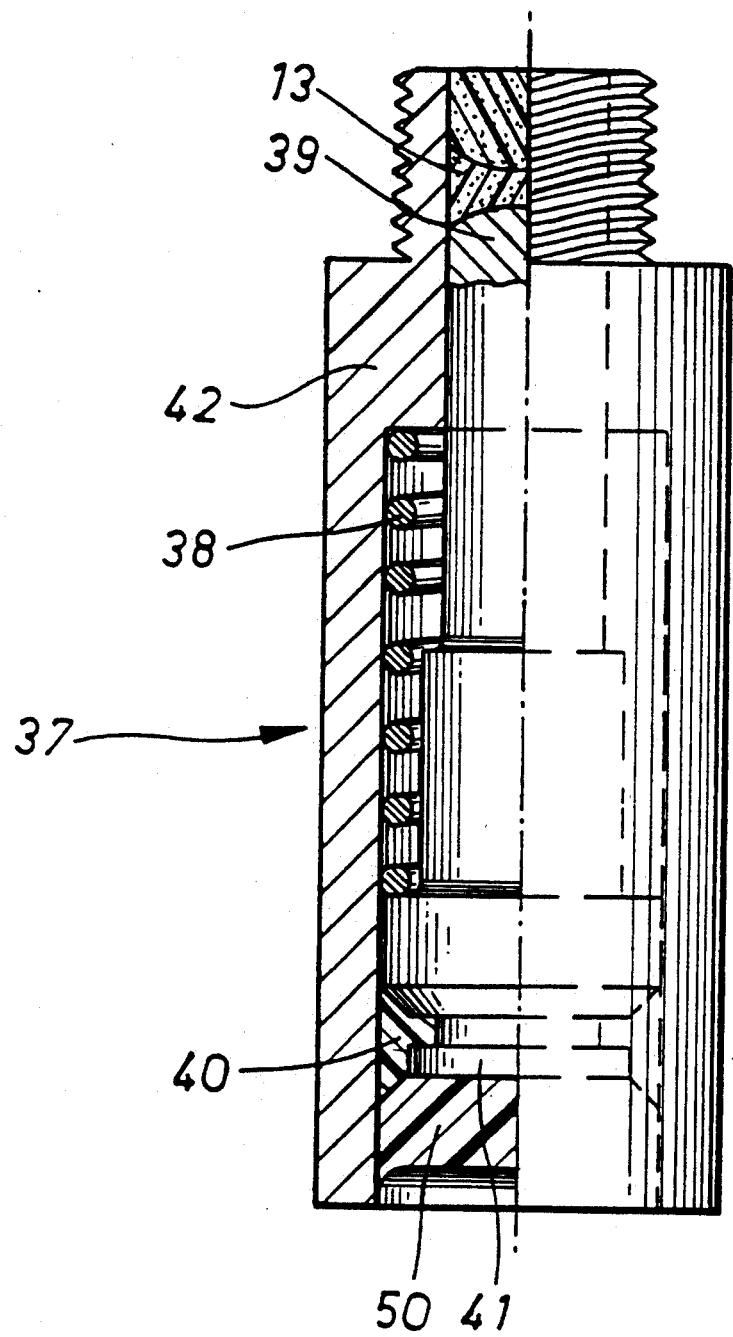

FIG. 7 illustrates another compression implement which can be used in the embodiment of FIG. 2 in place of a compensator 18. In this embodiment, inside a portion 42 of such compression implement 37 is fitted a plunger element 39 acting through a sealing 13 on elastomer 3. The plunger element 39 is provided with a spring means 38, said spring means serving as a compensator for eliminating the pressure fluctuations caused by temperature differences. The other end 41 of element 39 is preferably provided with a TEFLON sealing 40 and an elastomer layer 50 which be compressed by means of a compacting agent, said pressurizing medium 37 serving as a pressure booster.

Figure 8:
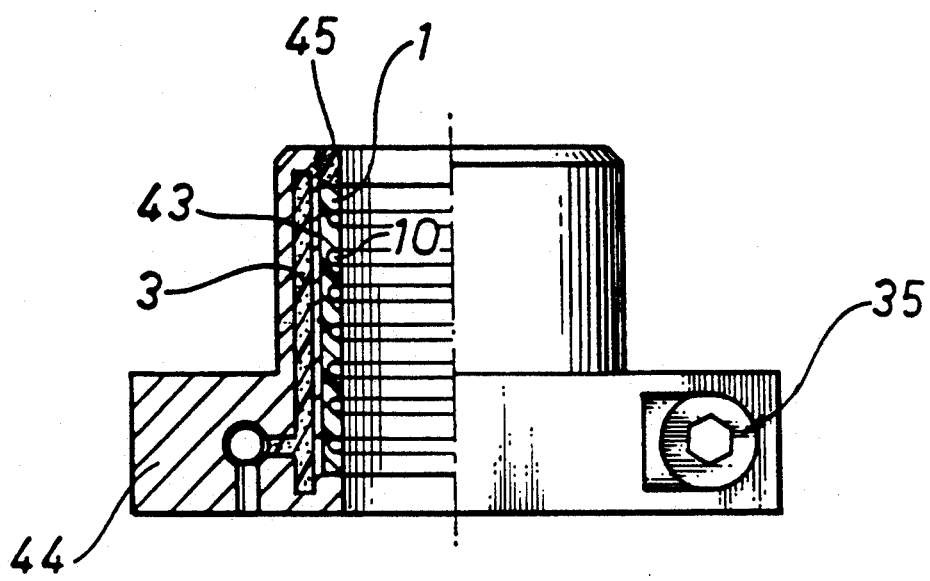

FIG. 8 illustrates yet another embodiment for a packing of the invention with a metal bracing 43 fitted between a TEFLON sleeve 1 and elastomer 3. In the illustrated embodiment, said metal bracing 43 is formed as an integral part of body 44. TEFLON sleeve 1 is set in position by means of a threaded portion 45. The compression of elastomer is effected by means of a compression implement 35 shown in FIG. 6.

An advantage gained by a shaft packing of the invention is that, by using a packing sleeve which is compressed or pressurized by means of elastomer, there is obtained a packing wherein the packing sleeve remains all the time in a sealing contact with a shaft even during the action of forces directed radially relative to the shaft and after the action of force is over. In addition, the packing can be readily subjected to a pressure exceeding that of the material to be packed by using a pressure booster which receives its operating pressure from the pressure of a material to be packed and carries the pressure in a boosted state to the elastomer and further to the packing sleeve. A benefit gained by this system is that the pressure fluctuations caused by temperature differences of a material to be packed do not affect the pressure difference between the shaft packing and the material to be packed. In addition, when using a pressure equalizer (compensator), a packing of the invention is useful over a relatively wide range of operating temperatures, circa (−) 50° C.-(+) 250° C.

The function of this type of packing is based on the idea of keeping elastomer off the walls of an elastomer chamber/passages by the application of a suitable grease. In addition, elastomer must be subjected to a relatively high pressure more than 50 bar and preferably more than 100 bar, in order to make the elastomer behave almost like oil and to have it serve as a hydraulic-fluid substituting medium. Thus, the system is preferably a closed system, wherein the compression of elastomer is effected by means of a spring-loaded spring element which serves at the same time as a compensator, or by using a pressure booster (FIG. 7) which takes its operating pressure from the pressure of a material to be packed. In order to avoid an excessive pressure effect applied to a TEFLON sleeve by the elastomer, a metal bracing can be fitted between the elastomer and a TEFLON sleeve (FIG. 8), or a TEFLON sleeve can be given a sufficient thickness to prevent an excessive compression thereof against a shaft to be packed.

The above embodiments are only described as examples of a few preferred embodiments of the invention and are not intended to limit the scope of protection defined for the invention in the annexed claims. A plurality of various modifications and combinations obvious to a skilled person can be made to the above embodiments For example, the compression implement may also comprise controllable heating elements (e.g., an electric resistance) instead of the above-described mechanical compression implements.

What is claimed is:

1. A radially energized steel assembly for sealing a gap between two surfaces, the seal assembly comprising: a packing member for sealing said gap; a body section for receiving said packing member, said body section being provided with a compression chamber communicating with a pressure medium space; a pressure medium comprising a pre-set silicone elastomer, the silicone elastomer being pressed into said pressure medium space for adjusting the sealing pressure of said packing member, wherein the silicone elastomer is at least substantially freely displaceable with respect to walls defining said chamber for allowing displacement of said silicone elastomer upon the application of pressure thereon by means of a pressure creating member; and means for compensating for thermal expansion of said packing member and said silicone elastomer.

2. The seal assembly of claim 1, wherein said silicone is in the form of pre-set particles.

3. The seal assembly of claim 2 comprising a release agent layer lying between the silicone elastomer and said walls for enabling the free displacement of the silicone by preventing it from sticking to said walls and facilitating the displacement of said silicone elastomer in said chamber.

4. The seal assembly of claim 1, wherein said pressure creating member and said means for compensating for thermal expansion together comprise a spring-loaded piston.

5. The seal assembly of claim 1, wherein said pressure creating member comprises a controllable heating element.

6. The seal assembly of claim 1, wherein said pressure creating member comprises a piston element actuatable by a pressure booster, said pressure booster receiving its operating pressure from material to be sealed, wherein said piston element comprises means for eliminating pressure fluctuations caused by temperature differences in said silicone elastomer and a material of said packing member.

7. A radially energized seal assembly according to claim 1 wherein the silicone elastomer comprises a two-component silicone elastomer comprising a silicone rubber base and a curing agent.

8. A radially energized seal assembly for sealing a gap adjacent a shaft, comprising a packing member for sealing said gap and a pre-set silicone elastomer, comprising at least one of particles and preshaped pieces, for adjusting the sealing pressure of said packing member, the packing member comprising a packing sleeve surrounding the shaft, said sleeve comprising a hard sealing material relative to said silicone elastomer, a packing box and a chamber for said silicone elastomer, the chamber being disposed on a side of said packing sleeve opposite to the shaft and the chamber being defined by the packing sleeve and the packing box, the silicone elastomer being disposed in the chamber, wherein the silicone elastomer serves as a pressure medium for being pressurized by means of a spring-loaded piston element for eliminating pressure fluctuations caused by temperature differences is said silicone elastomer and a material of said packing member.

9. A radially energized seal assembly according to claim 8 wherein the silicone elastomer comprises a two-component silicone elastomer comprising a silicone rubber base and a curing agent.

10. A radially energized seal assembly for sealing a gap adjacent a shaft, comprising a packing member for sealing said gap and a pre-set silicone elastomer, comprising at least one of particles and preshaped elastomer pieces, for adjusting the sealing pressure of said packing member, the packing member comprising a packing sleeve surrounding the shaft, said sleeve comprising a hard sealing material relative to said silicone elastomer, a packing box and a chamber for the silicone elastomer, the chamber being disposed on an opposite side of said packing sleeve relative to the shaft and being defined by the packing sleeve and the packing box, the silicone elastomer being disposed in the chamber, wherein the silicone elastomer serves as a pressure medium for being pressurized by means of a controllable heating element.

11. A radially energized seal assembly according to claim 10 wherein the silicone elastomer comprises a two-component silicone elastomer comprising a silicone rubber base and a curing agent.

12. A radially energized seal assembly for sealing a gap between two surfaces, the seal assembly comprising a packing member for sealing said gap and a two-component pre-set silicone elastomer, comprising at least one of particles and pieces, for adjusting the sealing pressure of said packing member, a pressure creating member for pressurizing the silicone elastomer, wherein the packing further comprises a compensator having a body portion provided inside with Belleville springs fitted with a pin member at its silicone-facing end, said compensator eliminating pressure fluctuations caused by temperature differences in said silicone elastomer and a material of said packing member.

13. The seal assembly of claim 12, wherein said pressure creating member is said compensator.

14. The seal assembly of claim 13 wherein the pin member is accompanied by a ball which, in turn, is associated with a polytetrafluorethylene made seal on one side and having elastomer on its other side.

15. A radially energized seal assembly according to claim 12 wherein the silicone elastomer comprises a two-component silicone elastomer comprising a silicone rubber base and a vulcanizing agent.

16. A radially energized seal assembly for sealing a gap between two surfaces, said assembly comprising a packing member for sealing said gap and a pre-set silicone elastomer comprising at least one of particles and pieces for adjusting the sealing pressure of said packing member, a compensator for pressurizing the silicone elastomer and for eliminating pressure fluctuations caused by temperature differences, wherein the compensator comprises a spring-loaded piston for moving in a cylinder and for allowing a small amount of the silicon elastomer to be present in said cylinder, whereby the piston element directly contacts only a small amount of said silicone elastomer for in turn pressurizing a remaining amount of the silicone elastomer.

17. A radially energized seal assembly according to claim 16 wherein the silicone elastomer comprises a two-component silicone elastomer comprising a silicone rubber base and a vulcanizing agent.

* * * * *